US009917320B2

(12) United States Patent
Thornton et al.

(10) Patent No.: US 9,917,320 B2
(45) Date of Patent: *Mar. 13, 2018

(54) SWEEP MEMBRANE SEPARATOR AND FUEL PROCESSING SYSTEMS

(71) Applicant: Battelle Memorial Institute, Columbus, OH (US)

(72) Inventors: Douglas A. Thornton, Columbus, OH (US); Vincent J. Contini, Powell, OH (US); Paul E. George, II, Powell, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/417,283

(22) Filed: Jan. 27, 2017

(65) Prior Publication Data

US 2017/0141422 A1    May 18, 2017

Related U.S. Application Data

(63) Continuation of application No. 14/241,569, filed as application No. PCT/US2012/053331 on Aug. 31, 2012, now Pat. No. 9,583,776.

(Continued)

(51) Int. Cl.
*H01M 8/06*     (2016.01)
*H01M 8/0662*   (2016.01)
(Continued)

(52) U.S. Cl.
CPC ........ *H01M 8/0675* (2013.01); *B01D 53/229* (2013.01); *B01J 19/24* (2013.01);
(Continued)

(58) Field of Classification Search
CPC .... H01M 8/0618; H01M 8/12; H01M 8/0675; H01M 2008/1293; B01J 19/24;
(Continued)

(56) References Cited

U.S. PATENT DOCUMENTS 3,241,293 A    3/1966   Pfefferle
4,300,999 A *  11/1981  Davies ............... C10G 45/02
                                                208/212

(Continued)

FOREIGN PATENT DOCUMENTS

EP    0320979 A2       6/1989
WO    2009150679 A1   12/2009
(Continued)

OTHER PUBLICATIONS

European Examination Report, Application No. 12769523.7, dated Jul. 11, 2017.

*Primary Examiner* — Raymond Alejandro
(74) *Attorney, Agent, or Firm* — MacMillan, Sobanski & Todd, LLC

(57)    ABSTRACT

A sweep membrane separator includes a membrane that is selectively permeable to a selected gas, the membrane including a retentate side and a permeate side. A mixed gas stream including the selected gas enters the sweep membrane separator and contacts the retentate side of the membrane. At least part of the selected gas separates from the mixed gas stream and passes through the membrane to the permeate side of the membrane. The mixed gas stream, minus the separated gas, exits the sweep membrane separator. A sweep gas at high pressure enters the sweep membrane separator and sweeps the selected gas from the permeate side of the membrane. A mixture of the sweep gas and the selected gas exits the sweep membrane separator at high pressure. The sweep membrane separator thereby separates (Continued)

the selected gas from the gas mixture and pressurizes the selected gas.

13 Claims, 5 Drawing Sheets

Related U.S. Application Data

(60) Provisional application No. 61/530,723, filed on Sep. 2, 2011.

(51) Int. Cl.
    *C01B 3/34*     (2006.01)
    *C01B 3/50*     (2006.01)
    *C10G 45/02*     (2006.01)
    *C10G 67/06*     (2006.01)
    *B01J 19/24*     (2006.01)
    *H01M 8/0612*     (2016.01)
    *H01M 8/12*     (2016.01)
    *B01D 53/22*     (2006.01)
    *H01M 8/124*     (2016.01)

(52) U.S. Cl.
    CPC ............... *B01J 19/245* (2013.01); *C01B 3/34* (2013.01); *C01B 3/501* (2013.01); *C01B 3/503* (2013.01); *C10G 45/02* (2013.01); *C10G 67/06* (2013.01); *H01M 8/0618* (2013.01); *H01M 8/12* (2013.01); *B01D 2053/221* (2013.01); *B01J 2219/24* (2013.01); *C01B 2203/0205* (2013.01); *C01B 2203/0227* (2013.01); *C01B 2203/0405* (2013.01); *C01B 2203/047* (2013.01); *C01B 2203/048* (2013.01); *C01B 2203/0475* (2013.01); *C01B 2203/066* (2013.01); *C01B 2203/0822* (2013.01); *C01B 2203/127* (2013.01); *C01B 2203/1235* (2013.01); *H01M 2008/1293* (2013.01); *H01M 2300/0074* (2013.01); *Y02E 60/525* (2013.01)

(58) Field of Classification Search
    CPC .......... B01J 19/245; C01B 3/34; C01B 3/503; C01G 45/02
    See application file for complete search history.

(56) References Cited

U.S. PATENT DOCUMENTS

| 7,785,562 | B1 | 8/2010 | Bossard | |
| 9,583,776 | B2 * | 2/2017 | Thornton | .................. C01B 3/34 |
| 2005/0220703 | A1 | 10/2005 | Ihara et al. | |
| 2011/0143229 | A1 * | 6/2011 | Chellappa | .............. C10G 27/12 |
| | | | | 429/410 |

FOREIGN PATENT DOCUMENTS

| WO | 201056829 | A2 | 5/2010 |
| WO | 2011033280 | A1 | 3/2011 |

* cited by examiner

SWEEP MEMBRANE SEPARATOR AND FUEL PROCESSING SYSTEMS

This application is a continuation of U.S. Ser. No. 14/241,569 filed Jun. 23, 2014, now U.S. Pat. No. 9,583,776 issued Feb. 28, 2017, which claims priority to PCT/US2012/053331 filed Aug. 31, 2012, which claims priority to U.S. Ser. No. 61/530,723 filed Sep. 2, 2011.

CROSS-REFERENCE TO RELATED APPLICATIONS

This application is a continuation patent application of U.S. patent application Ser. No. 14/241,569, filed Jun. 23, 2014. U.S. patent application Ser. No. 14/241,569 is the National Phase of International Application PCT/US2012/053331 filed Aug. 31, 2012 and was published on Mar. 7, 2013 as International Publication Number WO 2013/033529A2. PCT/US2012/053331 claims priority to U.S. Provisional Application No. 61/530,723, filed Sep. 2, 2011. Thus, the subject nonprovisional application claims priority to U.S. Provisional Application No. 61/530,723, filed Sep. 2, 2011. The disclosures of these applications are incorporated herein by reference.

BACKGROUND OF THE INVENTION

This invention relates in general to membrane separators and to fuel processing systems.

In the field of hydrocarbon fuel processing, a need exists for efficient ways to reduce organic sulfur components and other contaminants. An example of the need for new desulfurization approaches involves power generation. One promising technology is fuel cells, which can provide a silent source of power having a low heat signature. However, most fuel cells require hydrogen or a hydrogen-rich gaseous mixture as fuel. Short of providing stored hydrogen gas, the primary means of supplying hydrogen is by reforming a hydrocarbon fuel. Both liquid and gaseous fuels may be reformed, with liquid fuels typically being more difficult due to more complex molecules and contained contaminants.

The fuel input to a liquid fueled fuel cell system must generally be free of specific contaminants, the most problematic being sulfur. However, liquid hydrocarbon fuels generally contain sulfur levels that are too high for direct use in fuel cells. For example, typical military and aviation fuel specifications allow up to 3000 ppm in JP8, JP5, and Jet-A. These are all common aircraft fuels, the first two being exclusively military fuels. Gasoline, diesel and heating fuels in the US have lower sulfur limits (15 ppmw), but the allowed and typical sulfur levels are still above those acceptable to fuel cell systems including most reforming technologies.

Current technologies for removing sulfur from liquid hydrocarbon feedstocks include hydrodesulfurization (HDS), a technology well known in the commercial world. Most commonly, HDS is carried out with hydrogen gas at high pressure being passed over a liquid hydrocarbon fuel in a cascade or trickle bed reactor. In a separate invention, Battelle Memorial Institute has developed an HDS system wherein a hydrogen-containing gaseous mixture, with the hydrogen at high partial pressure, is mixed with vaporized raw fuel and put in contact with a selective catalyst (see U.S. patent application no. 2009/0035622 A1, published Feb. 5, 2009, which is incorporated by reference herein). In both systems, the sulfur in the fuel then combines with the hydrogen, freeing itself from the fuel and becoming primarily gaseous hydrogen sulfide. The hydrogen sulfide can then be absorbed or removed by other means.

There is a need for an improved apparatus for supplying hydrogen at high pressure for use in HDS systems and other applications. There is also a need for improved fuel processing systems including such an apparatus. More generally, there is a need for an improved apparatus for supplying pressurized gases for many different applications.

SUMMARY OF THE INVENTION

A sweep membrane separator includes a membrane that is selectively permeable to a selected gas, the membrane including a retentate side and a permeate side. A mixed gas stream including the selected gas enters the sweep membrane separator and contacts the retentate side of the membrane. At least part of the selected gas separates from the mixed gas stream and passes through the membrane to the permeate side of the membrane. The mixed gas stream, minus the separated gas, exits the sweep membrane separator. A sweep gas at high pressure enters the sweep membrane separator and sweeps the selected gas from the permeate side of the membrane. A mixture of the sweep gas and the selected gas exits the sweep membrane separator at high pressure. The sweep membrane separator thereby separates the selected gas from the gas mixture and pressurizes the selected gas. In certain embodiments, the sweep gas is steam and the selected gas is hydrogen.

DETAILED DESCRIPTION OF THE PREFERRED EMBODIMENTS

The present invention relates to a sweep membrane separator suitable for supplying pressurized gases for many different applications, such as supplying hydrogen at high pressure for use in an HDS reactor in a fuel processing system. It also relates to different embodiments of fuel processing systems including the sweep membrane separator. The invention can be used with all different types of fuel cells, such as PEM (proton exchange membrane), SOFC (solid oxide fuel cells), phosphoric acid, molten carbonate, or alkaline fuel cells.

Figure 1:
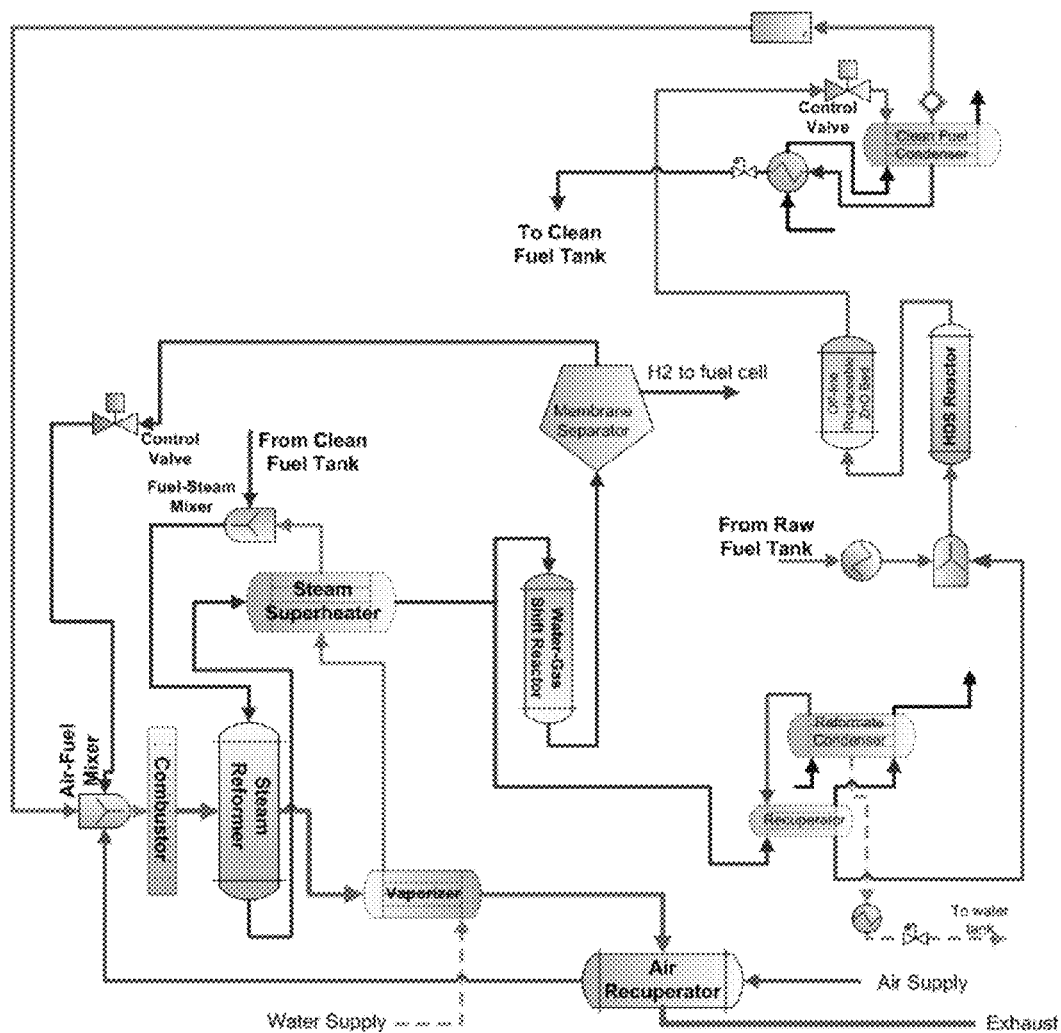
FIG. 1 is a schematic diagram of a fuel processing system that can be used to provide high purity hydrogen to a fuel cell stack, and that includes several improved features described herein, but that does not include a sweep membrane separator to supply hydrogen to the HDS system.

The invention further relates to various features of fuel processing systems that do not include the sweep membrane separator. For example, FIG. 1 shows a basic system schematic for a fuel processing system that can be used to provide high purity hydrogen to a fuel cell stack. Some examples of features shown in FIG. 1 include the following:

A slipstream of reformate is directed to the HDS system prior to the shift reactor.

Water is condensed from the reformate prior to the HDS system. The reformate is recuperated to elevated temperature after the condenser.

Fuel leaving the HDS system is passed over a ZnO bed which removes most sulfur species but may not remove sulfur carbonyl (COS), a possible byproduct of the HDS reaction due to the presence of CO and $CO_2$ in the reformate.

After the HDS system and ZnO bed, the clean fuel is condensed before being supplied to the reformer.

In the embodiment shown, the condensed fuel is transferred to a clean fuel storage tank for future use by the reformer, but alternatively it could be directed immediately to the reformer.

In an example of a fuel processing system similar to that shown in FIG. 1, the system can generate clean, desulfurized fuel that is then used in the system for both the fuel cell supply and to clean up raw, high-sulfur fuel using gas phase hydrodesulfurization. An example of operating conditions for the HDS reactors is about 280 psig and 380° C. These conditions may also be used for the ZnO bed although slightly cooler temperatures may be preferred. Typically the hot fuel/hydrogen mix leaving the ZnO bed would be recuperated to preheat another cooler stream (not shown) before being directed to the condenser. The reformate not consumed in the HDS process is separated in the condenser and routed to the combustor for a steam reformer to make use of the residual chemical energy. Because reformate is used to desulfurize the fuel in FIG. 1, the clean fuel must be at lower pressure than the reformer feed and it is more efficient to condense and pump the fuel than to attempt to compress the hot fuel/reformate mixture to supply it directly to the reformer.

Figure 2:
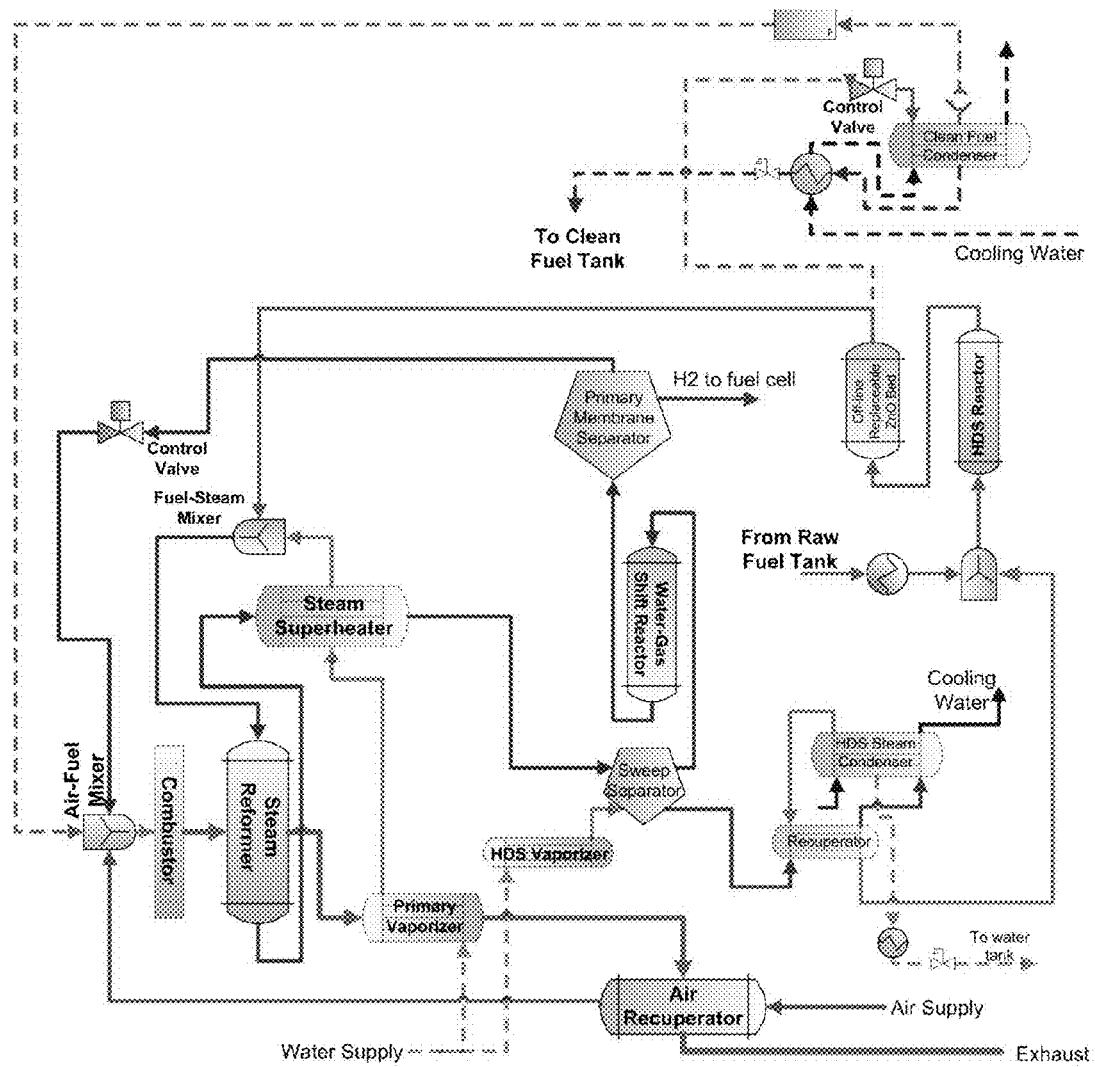
FIG. 2 is a schematic diagram of a fuel processing system that includes a sweep membrane separator according to the invention. In this system the fuel is not condensed before entering the reformer.

FIG. 2 shows a fuel processing system similar to that shown in FIG. 1 but further including a sweep membrane separator according to the invention (referred to in the figure as a "Sweep Separator"). In this system, the clean fuel does not need to be condensed before entering the reformer. This simplifying feature is available because the inclusion of the sweep separator allows the HDS system to be operated at a higher pressure than the reformer. Some examples of features shown in FIG. 2 include the following:

The fuel condenser and associated hardware are shown dashed to indicate that they are not needed. Typically this hardware may be included in a complete system to produce clean liquid fuel to support start-up, but this hardware is not needed for normal operation and if included can be substantially smaller since it only needs to produce a small amount of fuel.

A second, but smaller water vaporizer has been added.

A second, but smaller membrane separator (the sweep separator) has been added.

Reformate leaving the steam superheater is directed to the sweep separator first then through a water-gas shift reactor and then to the same membrane present in FIG. 1.

Steam is directed from the small vaporizer into the hydrogen side of the small membrane separator where it picks up hydrogen and transfers it to the HDS steam condenser where the water is mostly condensed out of the system leaving only high pressure hydrogen in the stream to the HDS reactor.

Some examples of benefits of this approach include the following:

The HDS system can operate at a pressure higher than the reformer because the pressure is determined by water flow through the small HDS separator and is independent of the reformate pressure.

Clean fuel can be directed to the reformer without condensation. When the clean fuel/hydrogen mixture is routed directly to the reformer as shown, the reformer pressure and HDS pressure are related through line pressure drop.

The excess hydrogen used for desulfurization is not "wasted" on combustion but is returned to the high pressure stream for use in the fuel cell.

The hydrogen mixed with the vaporized fuel as it enters the reformer reduces the potential for carbon formation.

There is minimal potential for COS formation as $CO_2$ and CO are not present in the HDS reactor feed stream.

The shift reactor following the initial membrane serves to replenish the hydrogen removed from the reformate yielding better overall hydrogen production compared to other systems.

The use of high purity hydrogen may enable the processing of more difficult fuels (e.g. diesel, naval fuels) than can be processed with reformate.

The use of high purity hydrogen may beneficially change the composition of the fuel by hydrogenating and breaking some aromatic ring structures.

These benefits apply to either a PEM, SOFC, or other fuel cell system if the fuel is routed directly from the HDS system (ZnO bed) to the reformer. For the case where the fuel is condensed after the ZnO bed, the benefits of the second, third and fourth bullets do not apply to either system.

Figure 3:
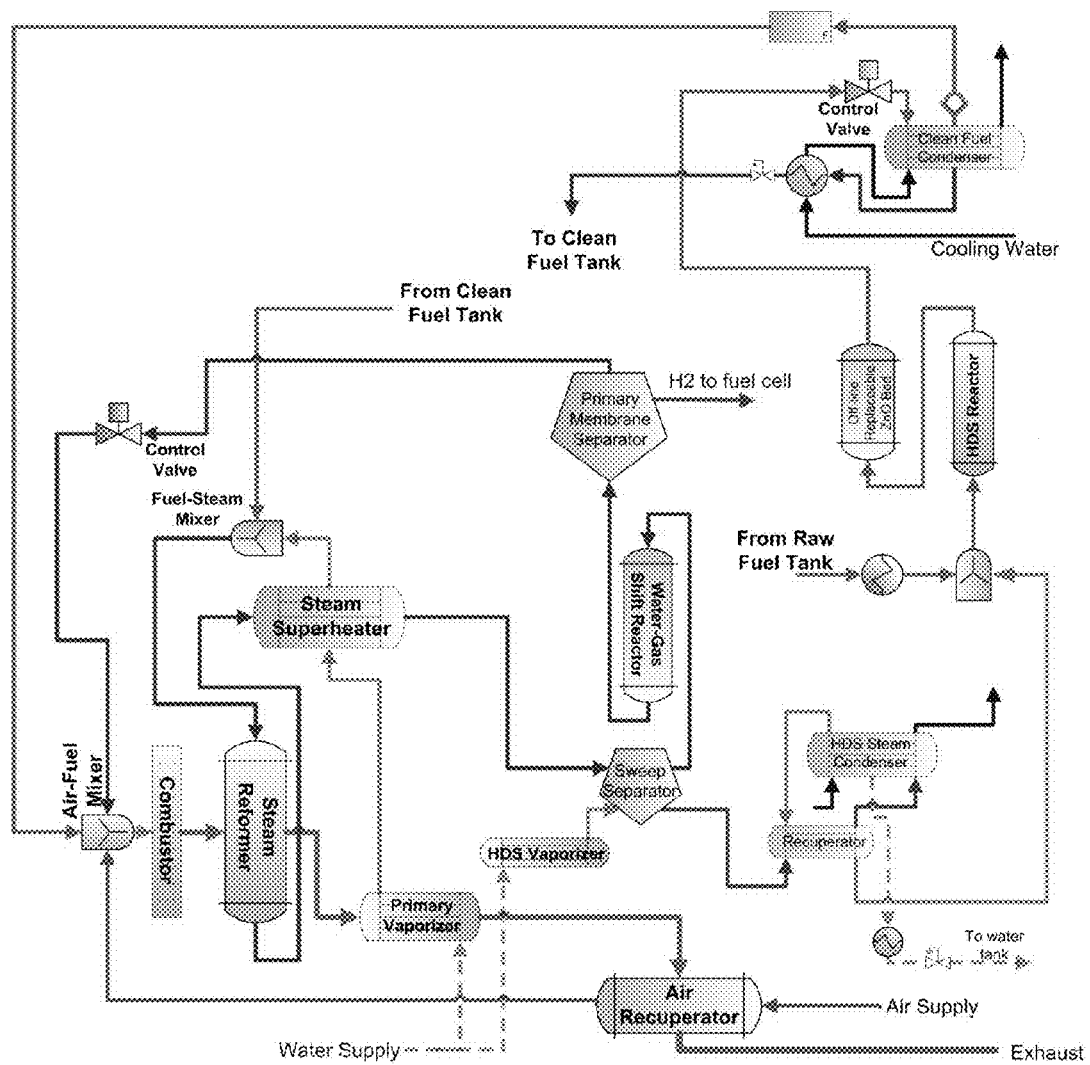
FIG. 3 is a schematic diagram of another fuel processing system that includes a sweep membrane separator according to the invention. In this system the fuel is condensed and then supplied to a reformer for normal operation.

FIG. 3 shows another fuel processing system that includes a sweep membrane separator according to the invention. In this system the fuel is condensed and then supplied to a fuel cell for normal operation, not just for start-up. That is, the fuel cell system can be operated in the condensed fuel mode. Such an approach may be appropriate for systems that are frequently started and stopped. It may also be useful where clean, desulfurized fuel is needed for other applications so that the fuel cell system serves not only to produce electrical power but to supply clean fuel for other uses.

Figure 4:
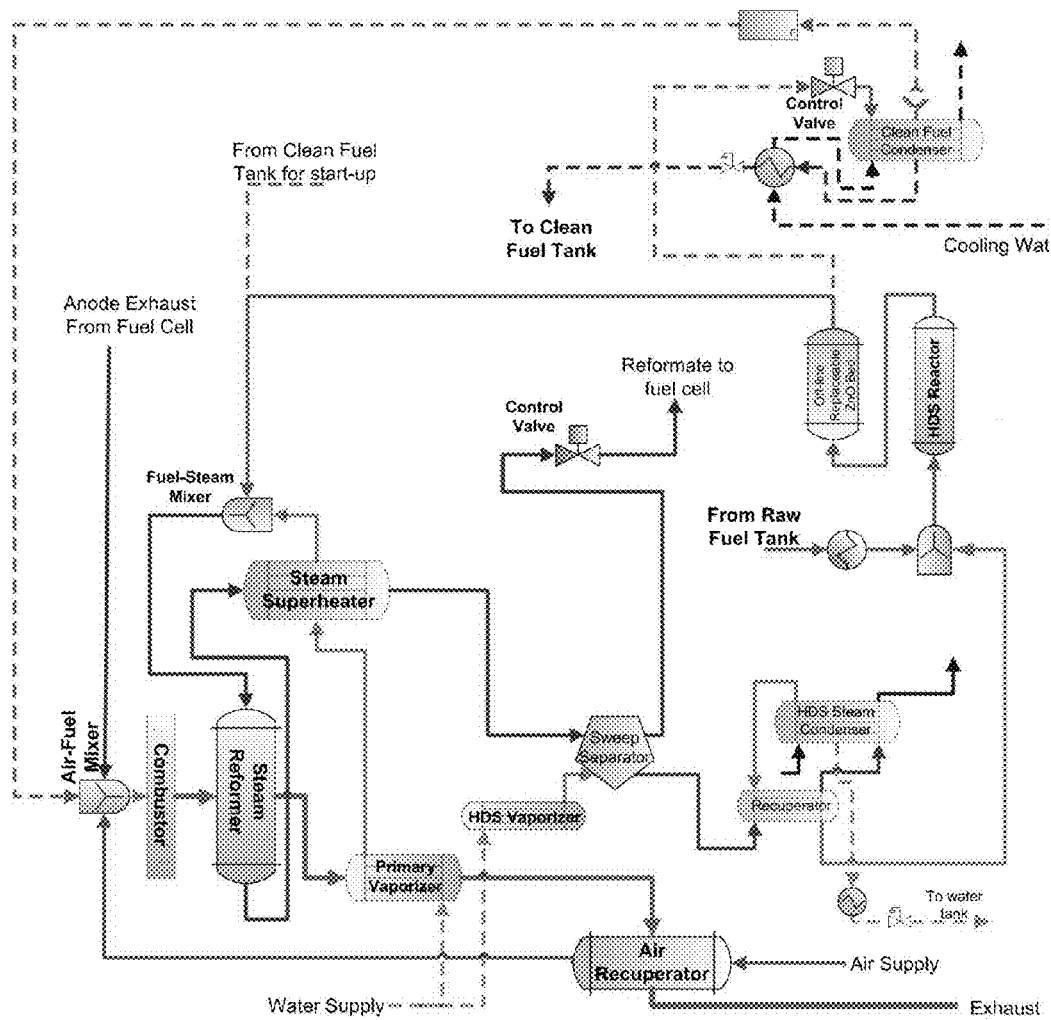
FIG. 4 is a schematic diagram of a fuel processing system for a solid oxide fuel cell that includes a sweep membrane separator according to the invention, and that does not include a large membrane separator or a water-gas shift reactor.

FIG. 4 shows a fuel processing system for a solid oxide fuel cell that includes a sweep membrane separator according to the invention. In contrast to the systems shown in FIGS. 1-3, this system does not include a large membrane separator or a water-gas shift reactor. Instead, the reformate is routed directly from the sweep separator through a control valve to the SOFC stack. FIG. 4 shows that fuel is not condensed before being directed to the reformer but such a system may also be operated in a manner similar to FIG. 3 where the fuel is condensed and then pumped into the reformer.

Further aspects of the invention are described below, some of which are illustrated in one or more of the above-described figures.

The invention relates to a fuel pre-processing system including:

a hydrodesulfurization (HDS) reactor operating at 200 to 500 psig and 200 to 500 C;

a sulfur compound absorbing reactor operating at 200 to 500 psig and 200 to 400 C;

a supply of hydrocarbon fuel possibly containing sulfur bearing material (e.g. benzothiophene); and a supply of hydrogen at a pressure equal to or greater than the HDS operating pressure.

The above-described fuel pre-processing system may include one or more of the following features in certain embodiments:

a. The sulfur compound absorbing reactor contains zinc oxide.
b. The HDS reactor contains a selective desulfurization catalyst such as may be known in the industry.
c. The hydrocarbon fuel and hydrogen are mixed before the HDS reactor.
d. The output stream is a mixture of clean fuel, hydrogen, and possibly secondary compounds such as partially hydrogenated fuel or secondary decomposition compounds from the original fuel.

The invention relates to a fuel processor including:

a fuel preprocessor as described above, the clean fuel output being directed to the reformer without being condensed;

a reforming reactor;

a primary water vaporizer (steam generator) to supply the reformer;

a secondary water vaporizer (steam generator) to supply the sweep separator; and a sweep separator to provide hydrogen to the fuel pre-processor described above.

The above-described fuel processor may include one or more of the following features in certain embodiments:

a. The reforming reactor is supplied by a burner to provide heat for reforming, the burner operating on excess reformate, off-gas from the HDS process, or other source.
b. The reforming reactor is a microtech type reactor.
c. The reforming reactor is designed for high heat transfer from the combustion gases.
d. The primary and secondary vaporizers are different sizes.
e. The primary and secondary vaporizers are designed for high heat transfer from the combustion gas.
f. The primary and secondary vaporizers are located downstream (in the combustion gas) of the reforming reactor.
g. The reformate leaving the sweep separator is provided directly to a fuel cell (e.g. SOFC or high temperature PEM).
h. The fuel processor includes a water gas shift reactor after the sweep separator.
i. The fuel processor that includes a main separator after the shift reactor.
j. The hydrogen output of the membrane separator is directed to a fuel cell (PEM, SOFC, or other type).
k. The retentate output of the membrane separator is directed to a burner to provide heat for reforming.
l. Vaporized fuel is used as the sweep gas.
m. The fuel processor includes a secondary burner to heat the system for start-up.

The invention relates to a fuel processor including:

a fuel preprocessor as described above, the preprocessor output being directed to a fuel condenser to remove clean fuel from the non-condensable gas;

a reforming reactor;

non-condensable gases from the clean fuel condenser being routed to the burner to provide heat for the reforming reaction;

part of the clean, condensed fuel being provided to the reformer for operation (start-up or normal); and part of the clean fuel potentially being supplied to another device or storage location to be used by other devices.

The invention relates to a fuel processor including:

a fuel preprocessor as described above, some portion of the clean fuel output being directed to the reformer without being condensed, and some portion of the clean fuel output being directed to a fuel condenser for storage or distribution;

a reforming reactor; and a sweep separator to provide hydrogen to the fuel pre-processor.

The invention relates to a fuel processor including a hydrodesulfurization reactor and a reforming reactor, the fuel processor operating at a pressure lower than the hydrodesulfurization reactor to allow non-condensed clean fuel to be supplied directly to the reforming reactor. In certain embodiments, the fuel processor operates at a pressure of 150-300 psig.

The invention also relates to a fuel processor including a reforming reactor, and a sweep membrane separator, where the sweep membrane separator is used to increase hydrogen content of feedstock prior to reformation. In some embodiments, the use of the sweep membrane separator positively affects catalyst lifetime and performance.

Figure 5:
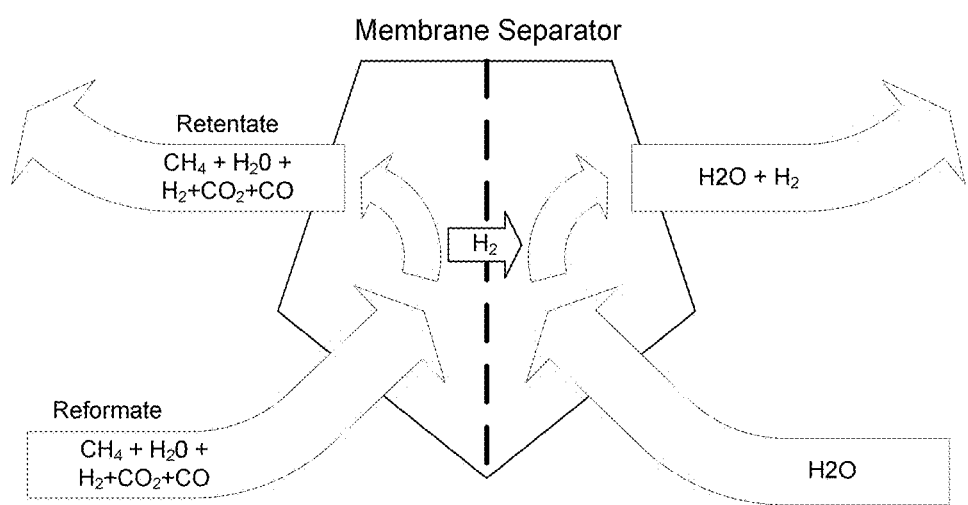
FIG. 5 is a schematic diagram of a sweep membrane separator in operation according to the invention.

Referring now to FIG. 5 and the following paragraphs, the sweep membrane separator and its function are described in more detail. As mentioned above in the Background section, Battelle has developed an HDS system that works with a hydrogen-containing gaseous mixture such as a reformate. Although the newly developed HDS system will work with mixed gases, the system requires high hydrogen partial pressures in the feedstock. We have found that the performance of such a system can be further enhanced through the use of gas streams that consist almost entirely of hydrogen if the hydrogen can be obtained at an appropriate pressure. The sweep membrane separator can be used for supplying hydrogen at high pressure for use in HDS systems and other applications.

The ability to supply pure hydrogen to the HDS system instead of reformate greatly simplifies system design and increases the effectiveness of the desulfurization process. Also, when supplying hydrogen to the HDS system instead of reformate, the reformate pressure can be controlled relatively independent of the HDS pressure, partially decoupling the two systems and reducing control complexity.

As shown in FIG. 5, the sweep membrane separator includes an outer housing of any suitable design, which is constructed to withstand the pressures associated with the operation of the separator. The sweep membrane separator also includes a membrane extending across the interior of the housing and dividing it into two sides, hereinafter referred to as the retentate side (the left side in FIG. 5) and the permeate side (the right side). The membrane is selectively permeable to hydrogen or another selected gas depending on the particular application. The illustrated membrane selectively allows the permeation of hydrogen molecules across the membrane from the retentate side to the permeate side. Membranes that are selectively permeable to hydrogen can be made from palladium alloys or other suitable materials. The membrane is provided with sufficient surface area to allow a desired rate of diffusion of the hydrogen through the membrane.

In operation, a mixed gas stream including hydrogen or other selected gas enters the sweep membrane separator and contacts the retentate side of the membrane. For example, when the sweep membrane separator is used in a fuel processing system the mixed gas stream may be a reformate. The membrane selectively allows the permeation of hydrogen across the membrane to the permeate side. At least part of the hydrogen separates from the mixed gas stream and passes through the membrane to the permeate side.

Because the hydrogen permeation rate is proportional to the partial pressure difference across the membrane, the hydrogen is withdrawn from the permeate side at a lower partial pressure than the retentate side. In certain embodiments, the hydrogen pressure on the permeate side is 1/20 to 1/100 of the hydrogen partial pressure on the retentate side. For example, when the mixed gas stream is a reformate entering the retentate side of the sweep membrane separator at 300 psig, the hydrogen which has passed through the membrane to the permeate side may be at a pressure of about 5 to 15 psig.

As described above, an HDS system requires an elevated hydrogen pressure to operate, for example a hydrogen pressure of about 270 psig or greater. To produce hydrogen at elevated pressure for use in HDS systems or other applications, the sweep membrane separator increases the pressure of the hydrogen that has passed through the membrane. This is accomplished by the use of a sweep gas at high pressure that enters the sweep membrane separator and sweeps the hydrogen from the permeate side of the membrane, thereby compressing the hydrogen. In certain embodiments, the hydrogen pressure may be increased to a pressure of about 200 psig or greater, and preferably about 250 psig or greater. For example, we have found that hydrogen may be produced at pressures of 250 psig or greater when extracting from a 300 psig reformate stream containing only 40% hydrogen (hydrogen partial pressure of about 120 psig in the reformate).

Because the sweep gas sweeps away the hydrogen from the permeate side, the hydrogen partial pressure difference driving hydrogen across the membrane continues to exist even though the absolute pressure on the permeate side of the membrane may be higher than that on the retentate side.

Any suitable sweep gas can be used with the sweep membrane separator. For example, the illustrated embodiment uses steam as the sweep gas. However, other gases can be used which are easily separated from hydrogen including other condensable gases such as refrigerants and heat transfer fluids. In one possible embodiment, vaporized fuel is used as the sweep gas either alone or in combination with another carrier gas.

In the illustrated embodiment, the steam hydrogen mixture exits the membrane separator and can then be cooled, the water condensed and removed, and the hydrogen reheated prior to mixing with the sulfur bearing fuel to provide a high purity hydrogen/sulfur-bearing-fuel stream to the HDS system. The temperature of the water condenser can be adjusted to allow the presence of some water into the HDS system, which may or may not be beneficial in supporting the reaction.

In short, the steam sweep membrane separator uses a hydrogen-selective membrane to supply hydrogen to a desulfurization process. The approach is to use steam to sweep hydrogen from a membrane separator followed by condensation of some or all of the water to provide hydrogen at a pressure elevated above the hydrogen partial pressure in the reformate, and therefore provide high purity hydrogen to a desulfurization process at a rate that can be adjusted by the rate of steam flow. Water flow rate is ultimately used to determine hydrogen flow rate on the permeate side for a given amount of hydrogen in the retentate at a given pressure.

The sweep membrane separator can be used in many different applications in fields such as automotive, chemical, and energy. For example, use of the separator in fuel cell systems can simplify and reduce the size of the systems. This approach has the potential to process heavy fuels in a small, compact configuration not achievable using other technologies. The pressurized hydrogen produced by the sweep membrane separator is beneficially used in an HDS system as described above. It may also be supplied directly to fuel cells operating at elevated pressure.

Although the sweep membrane separator has been described in detail, more generally the invention provides a method of compressing hydrogen without the use of mechanical compressing equipment. The method involves providing hydrogen, and using a gaseous sweep stream to compress the hydrogen. In certain embodiments, the sweep stream comprises pressurized steam. The method can be performed in relation to the steam sweep membrane separator, but it could also be performed in other ways.

The invention claimed is:

1. A fuel processing system comprising:
   a hydrodesulfurization reactor;
   a raw sulfur-bearing hydrocarbon fuel supply connected to the hydrodesulfurization reactor; and
   a sweep membrane separator connected to the hydrodesulfurization reactor, the sweep membrane separator including a membrane that is selectively permeable to hydrogen; the membrane including a retentate side and a permeate side;
   a supply of reformate configured to enter the sweep membrane separator and contact the retentate side of the membrane, the reformate including hydrogen;
      wherein at least part of the hydrogen separates from the reformate and passes through the membrane to the permeate side of the membrane; and,
      wherein the reformate, minus the separated hydrogen, exits the sweep membrane separator;
   and,
   a supply of sweep gas configured to enter the sweep membrane separator and sweep the hydrogen from the permeate side of the membrane;
      wherein a mixture of the sweep gas and the hydrogen exits the sweep membrane separator; and,
      wherein the sweep membrane separator separates hydrogen from the reformate and pressurizes the hydrogen.

2. The fuel processing system of claim 1 further comprising a vaporizer configured to produce the sweep gas for the sweep membrane separator.

3. The fuel processing system of claim 1 further comprising a vaporizer configured to vaporize the sulfur-bearing hydrocarbon fuel prior to the hydrodesulfurization reactor.

4. The fuel processing system of claim 1, wherein the sweep gas is steam.

5. The fuel processing system of claim 1, wherein the sweep gas is vaporized fuel.

6. The fuel processing system of claim 1 further comprising a reforming reactor configured to produce and feed a reformate to the sweep membrane separator.

7. The fuel processing system of claim 6 wherein the hydrodesulfurization reactor is configured to operate at a higher pressure than the reforming reactor.

8. The fuel processing system of claim 6 further comprising a burner configured to heat the reforming reactor, wherein the burner operates on excess reformate or off-gas from the hydrodesulfurization reactor.

9. The fuel processing system of claim 6 further comprising a burner configured to heat the reforming reactor, and a fuel condenser configured to remove clean fuel from non-condensable gases, the non-condensable gases being directed to the burner.

10. The fuel processing system of claim 6 wherein the reforming reactor is a microtech reactor.

11. The fuel processing system of claim 6 further comprising a clean fuel output at least a portion of which is directed to the reforming reactor.

12. The fuel processing system of claim 6 wherein the sweep membrane separator is connected to direct hydrogen to the reforming reactor.

13. The fuel processing system of claim 6 further comprising a solid oxide fuel cell, and wherein fuel processing system directly routes reformate from sweep membrane separator to the solid oxide fuel cell.

* * * * *